United States Patent [19]

Vercruysse, Jr.

[11] 4,319,394
[45] Mar. 16, 1982

[54] METAL RECOVERY APPARATUS

[76] Inventor: George M. Vercruysse, Jr., 1516 Military, Omaha, Nebr. 68101

[21] Appl. No.: 102,605

[22] Filed: Dec. 12, 1979

[51] Int. Cl.³ .................. B23P 23/00; B02C 19/12; B07B 7/01

[52] U.S. Cl. .................. 29/564.4; 29/403.3; 241/14; 241/101.4

[58] Field of Search ............. 29/564.3, 564.4, 403.3, 29/403.1, 403.2; 241/14, 27, 101.4; 81/9.51

[56] References Cited

U.S. PATENT DOCUMENTS

| | | | |
|---|---|---|---|
| 2,678,169 | 5/1954 | Tullis | 241/14 X |
| 2,750,120 | 6/1956 | Pallmann | 241/27 |
| 2,951,403 | 9/1960 | Bunch et al. | 81/9.51 |
| 3,074,653 | 1/1963 | Schorsch | 241/14 |
| 3,650,012 | 3/1972 | Graveman | 29/403.3 |
| 3,662,453 | 5/1972 | Meal et al. | 29/564.3 |
| 3,670,969 | 6/1972 | Terada | 29/403.3 X |
| 3,705,694 | 12/1972 | Slocum | 241/14 |
| 3,749,322 | 7/1973 | Reynolds | 241/14 X |
| 3,857,306 | 12/1974 | Gudmestad | 81/9.51 |

FOREIGN PATENT DOCUMENTS 676319 7/1979 U.S.S.R. ................ 241/14

Primary Examiner—William R. Briggs
Attorney, Agent, or Firm—Henderson & Sturm

[57] ABSTRACT

Apparatus for recovering metal from an insulated wire includes a feeding assembly leading to a cutting assembly. The cutting assembly forces the cut wire into a hammer assembly where the cut wire is hammered and separated from the insulation. The insulation is separated from the cut wire by a vacuum device. The cut wire is recovered and packaged for suitable shipment.

15 Claims, 5 Drawing Figures

METAL RECOVERY APPARATUS

TECHNICAL FIELD

This invention relates to metal recovering and more particularly to metal recovery from insulated wire.

BACKGROUND ART

Due to shortages of many vital raw materials, it has become extremely important to safeguard and make full use of available raw materials. This is accomplished to some extent by recovering salvageable materials for re-use. The shortages have made such recovery procedures extremely useful and worthwhile for many reasons. One reason is that it is a basic conservation of energy procedure. It is much easier to reprocess metals from scrap metal than it is to process metal from ore. This factor, combined with the difficulty of recovering the metal from ore, leads one to a clear conclusion that such recovery is extremely desirable.

Another conservation benefit is the preservation of raw materials. Raw materials are becoming limited and must be conserved to the greatest possible extent. By recovering materials which have already been used for a particular purpose, raw materials are conserved. Furthermore, energy is not expended to convert the raw materials into a usable form. A major problem with recovery of these materials, when they have been designed for use in one purpose, is to isolate them from the material that makes them suitable for that purpose and provide for a means of rendering them suitable for another purpose.

For a specific point, there is a substantial amount of copper wire in use in many ways. For example, the telephone company has many copper cables which it is replacing with other cables. If this supply of copper can be recovered, a great savings in copper ore and energy used for the smelting of copper can result. The achievement of these great savings is a problem because the copper wire in such use has a variety of coatings thereon. It is a problem in the prior art to separate these coatings from the copper wire and recover the copper wire in its copper form for use in making a new copper article. If an apparatus or method can be designed to simplify such recovery problems, the benefits become clear.

DISCLOSURE OF THE INVENTION

Therefore, it is an object of this invention to provide an apparatus which will conserve energy.

A further object of this invention is to provide an apparatus which conserves raw materials.

A still further object of this invention is to provide an apparatus which simplifies recovery of metal from insulated wire.

Yet a further object of this invention is to provide an apparatus which simplifies recovery of copper from insulated wire.

Also an object of this invention is to provide a process for conserving raw materials.

Another object of this invention is to provide a process for conserving energy.

Still another object of this invention is to provide a process for recovering metal.

A further object of this invention is to provide a process for recovering copper from insulated wire.

These and other objects of this invention, which will become evident from consideration of the specification and the attached drawings, are met by providing a metal recovery apparatus having a feed assembly which feeds insulated wire, such as copper wire, to a cutting assembly. The cutting assembly forces the cut wire to the rim of a cutting assembly housing where hammers pound the cut wire to separate the insulation from the wire. A vacuum device in the cutting assembly housing removes the insulation from the housing area while the cut copper wire falls through a screen at the lower part of the cutting assembly housing onto a vibrating table and into a recovery assembly.

BRIEF DESCRIPTION OF THE DRAWINGS

The metal recovery apparatus of this invention is illustrated in the drawings wherein.

BEST MODE FOR CARRYING OUT THE INVENTION

Figure 1:
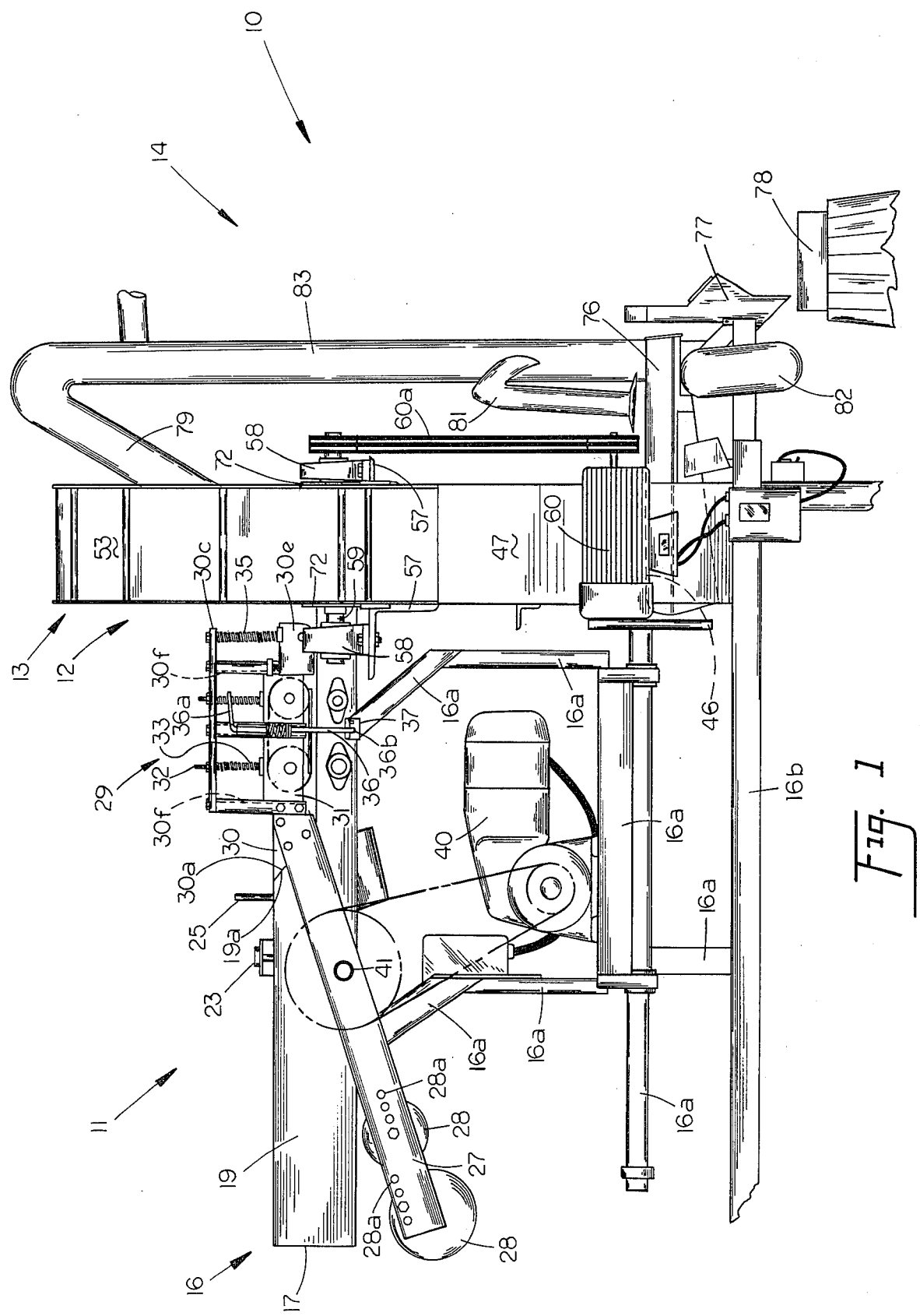
FIG. 1 is a side elevational of the metal recovery apparatus.

This invention of a metal recovery apparatus is shown generally at 10 in FIG. 1. The metal recovery apparatus 10 more particularly includes a feed assembly 11, a cutter assembly 12, a hammer assembly 13 and a recovery assembly 14.

Figure 2:
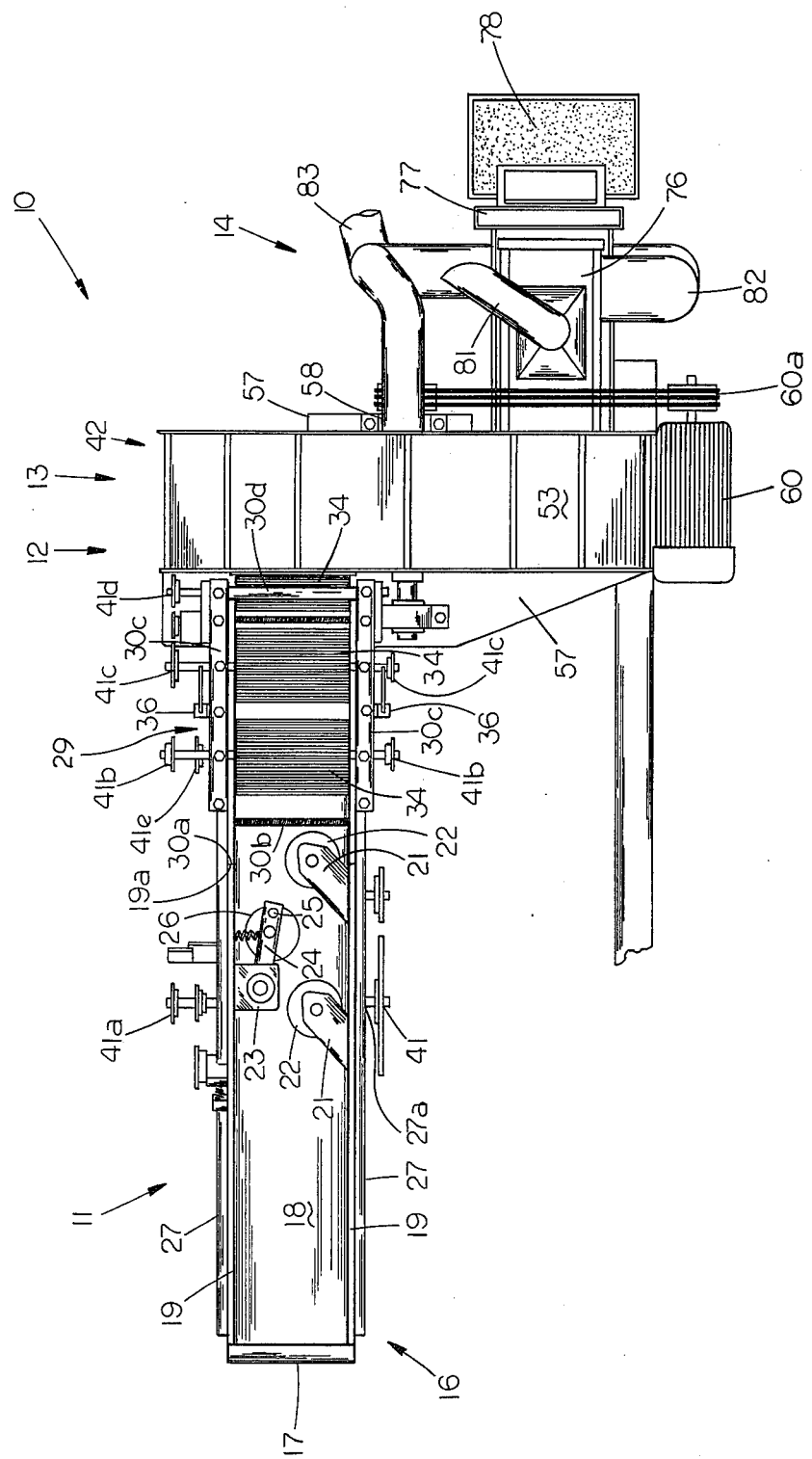
FIG. 2 is a top plan view of the metal recovery apparatus.

Referring now to FIGS. 1 and 2, the feed assembly 11 includes an elongated ramp 16 having structures 16a for providing support which extend downwardly therefrom to a base or ground 16b and over to the cutter and hammer assemblies 12, 13. The ramp 16 has an input end 17. The ramp 16 has an upper surface 18 and side surfaces which extend upwardly above surface 18 to form tray walls 19. The tray walls 19 extend from the input end 17 approximately two-thirds the length of the ramp 16, terminating in beveled edges 19a. Fixed normal to one of the walls 19 are a pair of supports 21. The supports 21 extend over the surface 18 toward the other wall 19 and are spaced apart along the length of the ramp 16. A guide roller 22 is mounted in each of the supports 21 and is rotatable about an axis normal to the surface 18. The rollers 22 are supported such that the peripheral surfaces thereof, at the points most inwardly disposed between the walls 19, are positioned over the longitudinal axis of the surface 18. A third support 23 is attached to the other wall 19. A spring-biased, adjustable pivoted support 24 extends from the support 23 over the surface 18. A hand-engageable pin 25 extends upwardly from the support 24. A third guide roller 26 is mounted in the support 23 and is rotatable about an axis normal to surface 18. The third roller 26 is positioned generally intermediate the rollers 22 with respect to the longitudinal axis of the ramp 16. The most inwardly disposed portion of the peripheral surface of the roller 26 is also generally positioned over the longitudinal axis of the surface 18.

Figure 3:
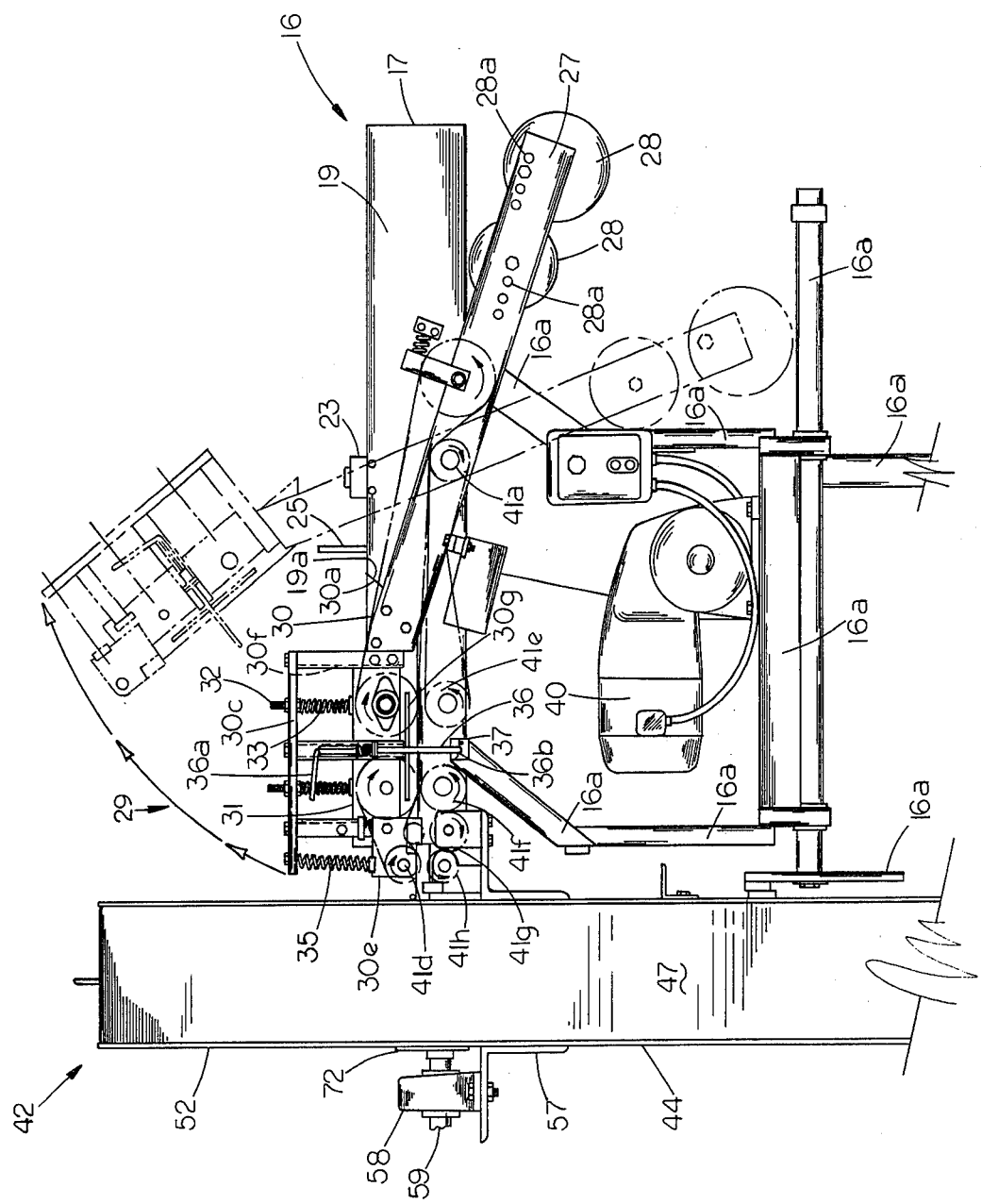
FIG. 3 is a fragmentary, side elevational view showing portions of the feed assembly in engaged and disengaged positions.

Referring to FIGS. 2 and 3, the feed assembly 11 also includes a parallel pair of roller housing arms 27 which are pivotally attached at 27a to ramp 16. The arms 27 extend from attachment 27a below the ramp 16 and toward the input 17, counterweights 28 being attached between, and adjacent the downwardly disposed ends of, the arms 27. A plurality of apertures 28a are formed through the arms 27 to provide adjustment for the counterweights 28. The arms 27 extend in the opposite direction above the ramp 16 and terminate in a roller housing structure 29.

The housing 29 includes a pair of cradles, each cradle having cradle plate 30 attached to an arm 27 as by bolts. The plates 30 have beveled edges 30a which rest against tray edges 19a when the housing arms 27 are in the operative down position (solid lines, FIG. 3). A transverse bolt 30b connects the plates 30. The cradles also have M-shaped members 30c which are attached to the plates 30. Each cradle defines a plane normal to surface 18. A front transverse member 30d connects the members 30c. A front plate 30e is pivotally attached to each of the cradle plates 30. Facing shoulder portions 30f are cut into the cradle plates 30 and the vertical (when in operating position) portions of the M-shaped members 30c. A plurality of bearing plates 31 are slidably mounted in the facing shoulders 30f. Each plate 31 has a guide rod 32 extending upwardly and projecting through the member 30c, and a bias spring 33 encircles the rod 32. A plurality of drive rollers 34, having longitudinal grooves, are mounted in the housing 29 and extend between the cradles. Two drive rollers 34 are rotatably mounted in bearing plates 31; the front drive roller 34 is rotatably mounted in the front plates 30e; and bias springs 35 are provided for the front roller 34 also.

Pressure latching levers 36 are mounted on each cradle and are rotatable about the longitudinal axes thereof. Each lever 36 at the upper end thereof has a hand-engageable handle 36a and at the lower end thereof a hook 36b. Catches 37 attached to each side of the ramp 16 are engageable by the hooks 36b to hold the housing 29 and the housing arms 27 in the down operating position.

The ramp 16 (FIG. 4) includes a plurality of second feed rollers 38, one for each of the first drive rollers 34, extending between the sides thereof. The rollers 18 are disposed substantially beneath, but project partially through, the surface 28. The rollers 38 are disposed away from the input 17 and adjacent the output end cutting edge 39.

An electric motor 40 is mounted on the ramp support structure 16a. Referring now to FIGS. 1 through 4, the motor drives sprocket 41 which in turn drives sprocket 41a. The sprocket 41a drives the sprockets 41b, thereby rotating the initial drive roller 34. The sprockets 41b drive the sprockets 41c, thereby rotating the intermediate drive roller 34. Sprockets 41d, driven by sprockets 41c, rotate the final drive roller 34. The sprocket 41a also drives sprocket 41e, rotating initial roller 38. Sprocket 41e drives gear 41f to rotate intermediate roller 38. Gear 41f, through intermediate gear 41g, drives gear 41h to rotate final roller 38. The arrows show rotation of the rollers, sprockets and gears when the motor 40 is driving the feed assembly 11 in the forward or input mode.

Figure 4:
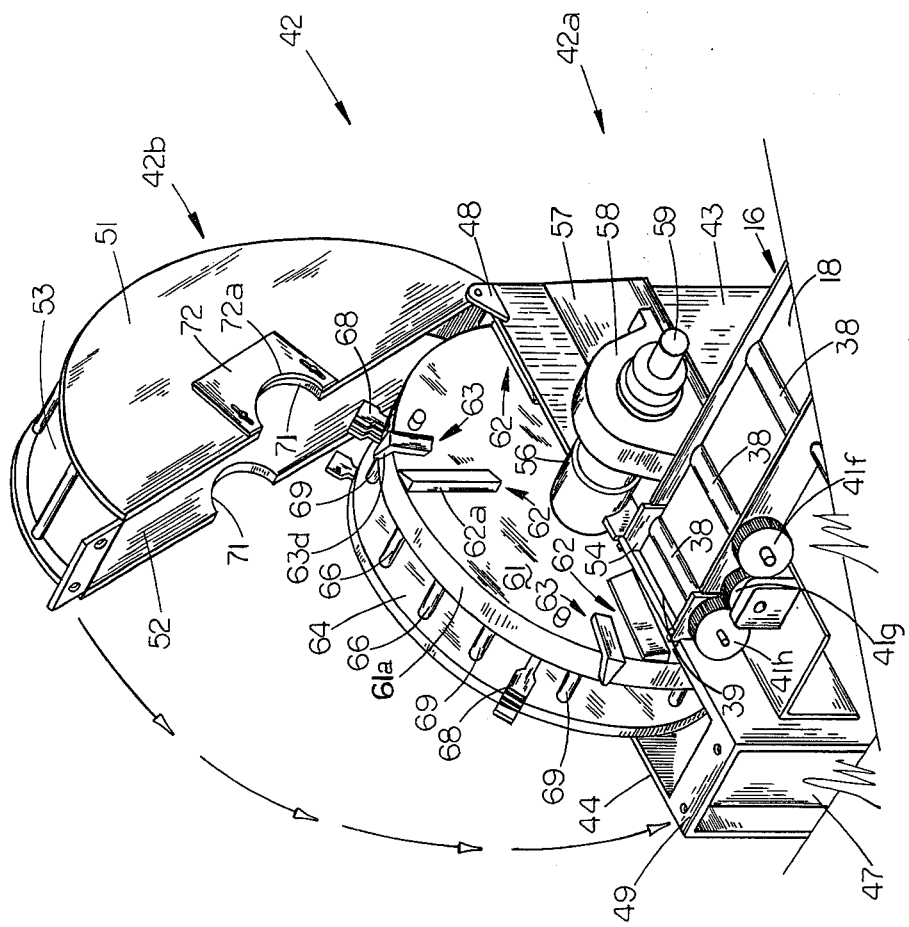
FIG. 4 is a fragmentary, perspective view showing the cutting and hammer assemblies.
Figure 5:
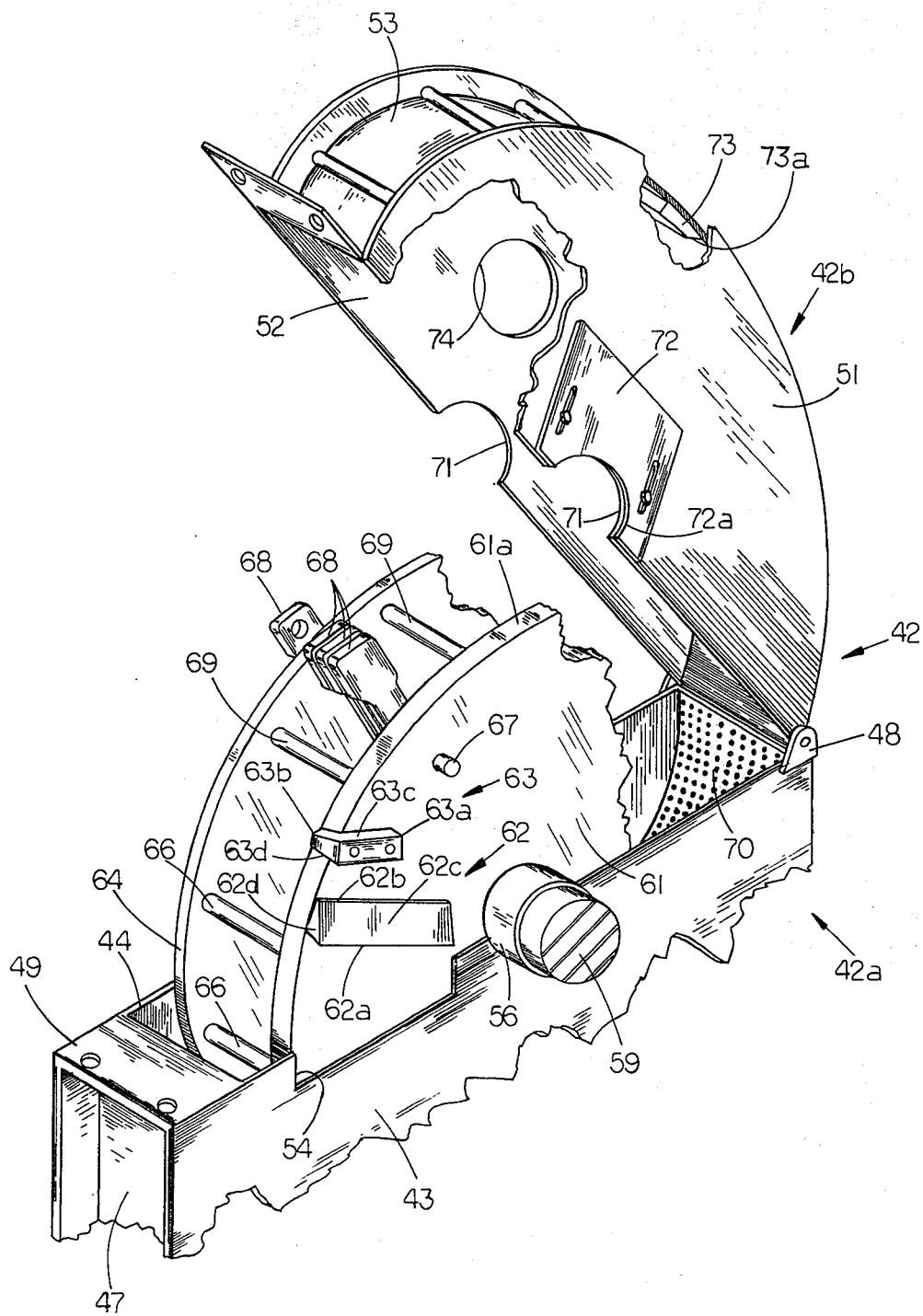
FIG. 5 is an enlarged fragmentary, perspective view more clearly showing vacuum elements of the recovery assembly.

Referring now to FIGS. 1, 4 and 5, the cutting assembly 12 includes a housing 42 having a bottom portions 42a. Parallel input and output side walls 43, 44 are connected by side walls 47 to form a bottom portions 42a having an open bottom 46. The housing 42 also includes a top portion 42b formed from input and output semi-circular plate walls 51, 52 connected by an arcuate wall 53. The top 42b is pivotally attached to the bottom 42a at the juxtaposition 48 of one end edge of wall 53 with one side wall 47 and is detachably connected, as by bolts, at the juxtaposition 49 of the opposite end edge of wall 53 with the other wall 47.

Again referring to FIG. 4, an elongated feed opening or notch 54 is cut into the top edge of the input side wall 43. As viewed from the ramp 16 side of the wall 43, the notch 54 is disposed to the left of the vertical line which bisects the wall 43. Semi-circular notches 56 are cut into the top edges of walls 43, 44 intermediate side walls 47. Horizontally disposed brackets 57 are attached to the input and output walls 43, 44 and journal boxes 58 are mounted thereon. A shaft 59 is rotatably mounted in the journal boxes 58. The ramp 16 rests upon the bracket 57, and the output end and cutting edge 39 is disposed in the notch 54. Attached to one side 47 and the bottom 46 of housing portion 42a is an electric motor 60 (FIGS. 1 and 2) connected by a belt drive 60a to the shaft 59.

The cutter assembly 12 includes a cutter wheel 61 mounted on the shaft 59 and disposed within the housing 42 but adjacent the input side walls 43, 51. The wheel 61 has a peripheral surface 61a. A plurality of cutter bars 62 are attached to the wheel 61 surface facing the input walls 43, 51. The cutter bars 62 are elongated, and the longitudinal axes thereof are aligned with radii of the wheel 61. Each cutter bar 62 (FIG. 5), includes longitudinal leading and trailing surfaces 62a, 62b, a sloping surface 62c extending between the surfaces 62a, 62b, and transverse end surfaces 62d. The surfaces 62a, 62b may both be normal to the wheel 61 surface, as shown in FIG. 4; however, it is preferable that the leading surface 62a be disposed at an acute angle (FIG. 5) to the wheel 61 surface, the angle opening in the direction of the rotation of the wheel 61 and away from trailing surface 62b, the leading surface 62a extending farther away from the wheel 61 than trailing surface 62b.

The cutter assembly 12 further includes a plurality of push bars 63 attached to the wheel 61. The push bars 63 are generally elongated, and the longitudinal axes thereof are aligned with wheel 61 radii. Each push bar 63 includes a generally rectangular portion 63a mounted to the wheel 61 surface facing the input walls 43, 51. Each push bar 63 also includes a portion 63b mounted upon surface 61a and contiguous with portion 63a. The contiguous trailing surfaces 63c of each bar 63 are generally normal to the plane of the wheel 61. The leading surface 63d of each bar portion 63b traverses the plane of the wheel 61 at an angle such that the bar portion 63b tapers, becoming narrower as it extends from the input facing surface to the output facing surface of the wheel 61.

The hammer assembly 13 includes a flywheel 64 mounted on the shaft 59 within the housing 42 toward the output walls 44, 52. A plurality of first connecting rods 66 extend between wheels 61, 64 parallel to shaft 59. Bearing rods 67 also extend between the wheels 61, 64 and project through flywheel 64 into the space adjacent the output walls 44, 52. A plurality of hammers 68 are attached to the bearing rods 67, preferably in units of four hammers 68 to each rod 67, one hammer 68 being disposed between the flywheel 64 and the output walls 44, 52 and three hammers 68 being disposed between the wheels 61, 64. When the hammers 68 are disposed parallel to radii of the wheels 61, 64 and extended away from shaft 59, they project beyond the periphery of the wheels 61, 64. A plurality of second connecting rods 69 extend between the wheels 61, 64 and project through the flywheel 64 in the manner of the rods 67. The rods 69 are radially disposed to each side of a rod 67 bearing a unit of hammers 68 and act as hammer stops to prevent any of the hammers 68 from pivoting about rods 67 toward the shaft 59. The wheels 61, 64 may be fabricated with a plurality of extra apertures (not shown) so positioned that additional rods 67 may be mounted, the rods 66 thereafter also performing the hammer stop function of rods 69. Alternatively, the rods 66 may be omitted.

The recovery assembly 14, FIGS. 1, 2 and 5, includes a screen or perforated wall 70 connected to the walls 43, 44 47 of the lower housing portion 42a below the wheels 61, 64 and above the bottom 46.

Arcuate cut-out areas 71 are formed in the side plate walls 51, 52. The areas 71 fit over the shaft 59 when the top housing portion 42b is pivoted down against housing portion 42a and fixed at 49; however, a space remains about the shaft 59 to permit air to flow into the housing 42. Slidably adjustable plates 72, having arcuate cut-out portions 72a, are attached to walls 51, 52 adjacent the areas 71. The portions 72a are shaped such that the plates 72 in one position fit against the bearing structures 56 to shut-off air flow into the housing. Intermediate the ends of arcuate wall 53, a transverse bump structure 73 is formed having a beveled edge 73a directed toward juncture 48. An exit aperture 74 is formed through the wall 52. When viewed from wall 51, the aperture 74 is disposed adjacent and to the left of bump structure 73.

Referring more particularly to FIGS. 1 and 2, a vibrating tray structure 76 communicates with the housing bottom 46. Disposed adjacent to, and below, the extended end of the tray 76 is a channel or chute structure 77. Disposed below the chute 77 is an output tray 78. A first vacuum intake tube 79 is attached over aperture 74. A second vacuum intake tube 81 is suspended over the tray 76. A third vacuum intake tube 82 communicates with the chute 77. The tubes 79, 81, 82 connect to a main vacuum tube 83, and the tube 83 is connected to apparatus (not shown) for pumping air.

Metals of suitable strength are employed in the construction of the metal recovery apparatus 10, hardened steels being employed for the cutting portions thereof.

When the metal recovery apparatus 10 is to be operated, the top housing half 42b is pivoted to close (FIG. 4) against the bottom housing half 42a and secured by bolts at 49. The line of insulated wire (not shown) is fed from its roll onto surface 18 and threaded between guide rollers 22 on the one side and guide roller 26 on the other. By pulling on the pin 25, the roller 26 may be drawn toward the side wall 9 to facilitate threading of the wire. Release of the pin 25 allows the spring to return the roller 26 against the wire. For those larger, heavier wires which have a heavy outer plastic protective casing surrounding the insulated wires, the casing is slit longitudinally, and the insulated wire is removed from the casing before being fed onto the surface 18 and between the guide rollers 22, 26.

The lead end of the wire is fed to a position adjacent the initial roller 38. The roller housing arms 27 are moved from the disengaged position (dotted lines, FIG. 3) to the operating position (solid lines, FIG. 3). The pressure levers 36 are operated to lock down the housing arms 27 and housing 29. The motor 60 is energized and brought up to speed, thereby rotating the wheels 61, 64. When viewed from the input side of the housing 42, and wheels 61, 64 rotate in a counterclockwise direction. The hammers 68 pivot from positions of rest against hammer stop rods 69 to positions of alignment with radii of the wheels 61, 64 and extension away from the shaft 59.

The air pump (not shown) is turned on, and air is drawn through intakes 79, 81, 82 to the main tube 83. The plates 72 are slidably adjusted to control air flow into the housing 42, somewhat greater air flow being desirable for situations where the insulation is somewhat heavier. The motor 40 is energized and drives the sprockets and gears in the direction indicated in FIGS. 1 and 3.

The wire is fed to the initial rollers 34, 38, is caught by the longitudinal grooves of the initial roller 34, and is drawn between the initial rollers 34, 38. The wire is flattened and driven by the initial rollers 34, 38 to the intermediate rollers 34, 38. The wire is again flattened and driven to the final rollers 34, 38. A further flattened wire is driven to the output end with cutting edge 39. The flattened wire has a multitude of impressions, which have been formed thereon by the longitudinal grooves of rollers 34, that facilitate cutting of the wire.

As the flattened and impressed wire passes into the feed opening 54, a leading surface 62a of a cutter bar 62 engages the wire, pushing it downwardly toward the cutting edge 39. The angle of the leading surface 62a also causes the cutter bar 62 to pull the wire into and through the opening 54, thereby facilitating feeding of the trailing end of the wire once it has passed the final rollers 34, 38. The cutter bar 62 passes closely by the edge 39, and the bar 62 and edge 39 operate to cut off a piece of wire from the line of wire. The piece of wire is engaged by the leading surface 62d of push bar portion 63b and guided to the housing space on the output side of the cutter wheel 61. The hammers 68 repeatedly strike the piece of wire, the metal falling to the perforated floor 70, and the insulation being drawn out the aperture 74. The floor 70 screens out much of the insulation not yet directly drawn out through the aperture 74 and keeps it circulating within the housing 42. Removal of the insulation is facilitated by the bump structure 73, as particles of insulation, which may be travelling in a counterclockwise direction adjacent the walls 47, 70, 53, are forced downwardly in front of the exit aperture 74.

The metal particles fall through the floor 70 to the vibrating tray structure 76. The vibrations cause sifting whereby stray insulating particles rise to the surface where they are drawn off through intake 81. The metal particles move down the tray 76, over the edge thereof, and through the chute 77. As the particles fall toward the output tray 78, the intake 82 removes remaining insulation. The insulation travels through main tube 83 and is caught in a filter adjacent the air pump.

INDUSTRIAL APPLICABILITY

The industrial applicability of the metal recovery apparatus 10 is believed to be apparent. The collected metal particles are substantially free of insulation and may be recycled. The savings in energy and in raw materials are substantial.

Although a preferred mode has been disclosed herein, it is to be remembered that various modifications and alternate constructions can be made thereto without departing from the scope of the invention, as defined in the appended claims.

I claim:

1. A process for recovering metal from insulated wire comprising the steps of:
    linearly moving uncut lengths of said wire along its axis;
    flattening said uncut lengths of said wire;
    forming multiple impressions on said uncut lengths of said wire substantially normal to its axis;
    cutting said flattened and impressed uncut lengths of said wire into pieces;
    beating said pieces into primarily metal and insulation components within a housing;
    screening through a perforated floor in the housing the primarily metal components onto a sloping tray;
    vibrating the sloping tray;
    moving the primarily metal components down the sloping tray through a chute into a receiving tray; and
    vacuuming the insulation components from the housing, the sloping tray and the chute.

2. A metal recovery apparatus for insulated metal wire comprising:
    a frame;
    first means attached to said frame for linearly moving into said apparatus an uncut length of said wire along its axis while flattening it;
    second means receiving the flattened wires from said first means for cutting the wire into pieces;
    third means receiving the cut wire from said second means for beating the wire to separate the metal and insulation components; and
    fourth means for separating and recovering the metal and insulation components in separate areas.

3. The metal recovery apparatus of claim 2 and further wherein said fourth means includes means for moving said primarily metal components therefrom onto a sloping tray and further comprising means for vacuuming the insulation components therefrom.

4. The metal recovery apparatus of claim 3 and further wherein said apparatus includes a housing having means formed therein for receiving said uncut length of said wire, means formed therein for taking in air, means formed therein connected through a first tube to said vacuuming means for exiting air and means attached thereto adjacent said air intake means for controlling the velocity of air through said housing.

5. The metal recovery apparatus of claim 4 and further wherein said metal components moving means includes a perforated floor attached within said housing through which primarily metal components can fall.

6. The metal recovery apparatus of claim 4 further comprising a means attached to said housing adjacent said air exiting means for bumping insulation components downwardly in front thereof.

7. The metal recovery apparatus of claim 3 and further:
    wherein said sloping tray has means for vibrating it and said vacuuming means includes a second tube disposed adjacent said sloping tray.

8. The metal recovery apparatus of claim 2 and further wherein said second means includes a rotatable wheel, at least one cutter bar attached to said wheel, and at least one push bar attached to said wheel adjacent said cutter bar.

9. The metal recovery apparatus of claim 8 and further wherein said push bar has a lead surface for directing said pieces.

10. The metal recovery apparatus of claims 2 or 8 and further wherein said third means includes a rotatable second wheel and at least one hammer unit attached to said second wheel.

11. The metal recovery apparatus of claim 10 and further wherein said hammer unit includes a plurality of hammers, said hammers being disposed to both sides of said second wheel.

12. The metal recovery apparatus of claim 7 further comprising:
    a chute disposed adjacent said sloping tray;
    a receiving tray connected to said chute; and
    a third tube connecting said chute to said vacuuming means.

13. The metal recovery apparatus of claim 2 or 8 and further wherein said first means includes means for forming multiple impressions on said uncut lengths of said wire substantially normal to its axis whereby the cutting thereof into pieces will be facilitated.

14. The metal recovery apparatus of claim 13 and further wherein said first means includes a ramp with at least one guide roller attached to said ramp and arm means pivotally attached to said ramp for bearing and movably disposing said impressing means adjacent to said guide roller.

15. The metal recovery apparatus of claim 14 and further wherein said ramp includes an output cutting edge.

* * * * *